US009269131B2

(12) United States Patent
Tsubaki et al.

(10) Patent No.: US 9,269,131 B2
(45) Date of Patent: Feb. 23, 2016

(54) IMAGE PROCESSING APPARATUS WITH FUNCTION OF GEOMETRICALLY DEFORMING IMAGE, IMAGE PROCESSING METHOD THEREFOR, AND STORAGE MEDIUM

(71) Applicant: CANON KABUSHIKI KAISHA, Tokyo (JP)

(72) Inventors: Hidetoshi Tsubaki, Kawasaki (JP); Ken Terasawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 25 days.

(21) Appl. No.: 14/096,787

(22) Filed: Dec. 4, 2013

(65) Prior Publication Data

US 2014/0161357 A1  Jun. 12, 2014

(30) Foreign Application Priority Data

Dec. 10, 2012  (JP) ................................. 2012-269403

(51) Int. Cl.
*G06K 9/48* (2006.01)
*G06T 5/00* (2006.01)

(52) U.S. Cl.
CPC ...................................... *G06T 5/006* (2013.01)

(58) Field of Classification Search
CPC ...................................................... G06T 5/006
USPC .......................................................... 382/197
See application file for complete search history.

(56) References Cited

U.S. PATENT DOCUMENTS

| 6,757,446 B1 * | 6/2004 | Li et al. ........................ 382/293 |
| 7,777,782 B2 * | 8/2010 | Eromaki .............. H04N 5/2254 348/208.4 |
| 8,059,894 B1 * | 11/2011 | Flagg et al. .................... 382/173 |
| 2005/0174346 A1 * | 8/2005 | Park et al. ...................... 345/422 |
| 2005/0206739 A1 * | 9/2005 | Kamoshida ............. G06T 5/006 348/208.99 |
| 2006/0280376 A1 * | 12/2006 | Lei ........................ H04N 3/2335 382/275 |
| 2007/0200873 A1 * | 8/2007 | Hsu ............................... 345/629 |
| 2008/0001956 A1 * | 1/2008 | Markovic et al. ............. 345/522 |

(Continued)

FOREIGN PATENT DOCUMENTS

| JP | 2004-336106 A | 11/2004 |
| JP | 2006-186884 A | 7/2006 |

*Primary Examiner* — Gregory F Cunningham
(74) *Attorney, Agent, or Firm* — Rossi, Kimms & McDowell LLP (57) ABSTRACT

An image processing apparatus which can increase processing speed, reduce memory access load, and enhance ease of control in image processing. Coordinate computations through different geometric deformations are performed on respective pixels of an input image, thus calculating post-geometric deformation coordinates and coordinate moving vectors. Geometric deformation parameters for geometric deformations are output to a plurality of coordinate computation units connected in series. The coordinate moving vectors are collectively combined together to generate combined coordinate moving vectors, based on which coordinates of pixels in an image to be output are converted into coordinates of the pixels of the input image. The coordinate computations are performed based on the coordinates of the pixels of the input image and the geometric deformation parameters. The post-geometric deformation coordinates output from the preceding coordinate computation units are input as coordinates of the pixels of the image to the second and subsequent coordinate computation units.

19 Claims, 8 Drawing Sheets

(56) References Cited

U.S. PATENT DOCUMENTS

| | | | |
|---|---|---|---|
| 2011/0157175 A1* | 6/2011 | Andres del Valle | G06T 3/0093 345/419 |
| 2011/0254950 A1* | 10/2011 | Bibby | G06T 7/0081 348/135 |
| 2014/0056513 A1* | 2/2014 | Grossmann | G06T 3/0056 382/162 |
| 2015/0262344 A1* | 9/2015 | Stec | G06T 5/006 382/275 |

* cited by examiner

IMAGE PROCESSING APPARATUS WITH FUNCTION OF GEOMETRICALLY DEFORMING IMAGE, IMAGE PROCESSING METHOD THEREFOR, AND STORAGE MEDIUM

BACKGROUND OF THE INVENTION

1. Field of the Invention

The present invention relates to an image processing apparatus, an image processing method, and a computer-readable storage medium storing a program for implementing the image processing method, and in particular to an image processing technique of geometrically deforming a taken image.

2. Description of the Related Art

As digital cameras have been becoming widespread, camera bodies have been increasingly downsized and angles of views have been widening. Under such circumstances, there has been a demand for evolution of shooting-assist functions in order to obtain satisfactory taken images in various scenes. For example, exemplary shooting-assist functions of geometrically deforming images include camera shake correction, electronic zooming, lens distortion correction, and correction for distortions caused by a rolling shutter of a sensor (hereafter referred to as "rolling shutter distortions"). It should be noted that in the following description, a "lens distortion correction" and a "rolling shutter distortion correction" will be referred to as "distortion corrections". It is preferred that the plurality of corrections and zooming are used in orders compliant with geometric roles so as to obtain desired effects.

A plurality of deformation elements which are geometrical (hereafter referred to as "geometric deformation elements"), however, needs to be collectively computed so as to enhance ease of use by increasing image processing speed and realize real-time processing (a taken image is checked on the spot, for example) of digital cameras. Accordingly, a computation method that combines amounts of deformations caused by a plurality of geometric elements is required.

As an exemplary method to collectively compute a plurality of geometric elements, there has been proposed a method that obtains an enlargement-reduction rate of an image based on chromatic aberration so as to correct for chromatic aberration and distortion of a lens (see Japanese Laid-Open Patent Publication (Kokai) No. 2004-336106). Also, as an exemplary method to correct for rolling shutter distortion and lens distortion at the same time, there has also been proposed a method that divides an image, measures rolling shutter distortions of the respective split images, and adds them and lens distortion correction amounts together (see Japanese Laid-Open Patent Publication (Kokai) No. 2006-186884).

Processing capabilities of a processing circuit which can be mounted on a digital camera are limited, and it is uneasy to obtain high-quality images by carrying out the above geometric deformations without making users to wait.

For example, according to the method described in Japanese Laid-Open Patent Publication (Kokai) No. 2004-336106, two elements consisting of a chromatic aberration and a lens distortion are geometric deformation elements, and both of them are used to correct for a deviation from an ideal state of a formed image due to lens refraction. Accordingly, by using a special method that increases and decreases the amount of change caused by distortion obtained in a preceding stage according to a difference in refractive index between colors by taking advantage of similar properties of color aberration and lens distortion, problems arising from a plurality of image processes being combined are circumvented. Therefore, this method cannot be applied to an object of efficiently processing geometric deformation elements having different properties, i.e. lens distortion and camera shake.

On the other hand, according to the method described in Japanese Laid-Open Patent Publication (Kokai) No. 2006-186884, geometric deformation elements with different properties, a rolling shutter distortion and a lens distortion are targeted for correction. According to this method, however, the amounts of change relating to a plurality of geometric deformation elements which should originally be calculated in succession are calculated at a time based on pre-transformation coordinates, and hence processing accuracy (image quality) is compromised instead of processing speed. On the other hand, when an arrangement in which the amounts of change relating to a plurality of geometric deformation elements are not calculated at a time, but processing circuits for a plurality of geometric deformation elements are simply connected together based on geometric rules, and images output from the respective processing circuits are input to processing circuits in succeeding stages is adopted, expensive computation circuits are required so as to realize high processing accuracy and high-speed processing.

SUMMARY OF THE INVENTION

The present invention provides an image processing apparatus and an image processing method which are capable of increasing processing speed, reducing memory access load, and enhancing ease of control in image processing, as well as a computer-readable storage medium storing a program for implementing the image processing method.

Accordingly, a first aspect of the present invention provides an image processing apparatus comprising a plurality of coordinate computation units configured to perform coordinate computations through different geometric deformations on respective pixels of an input image, thus each calculating post-geometric deformation coordinates and coordinate moving vectors, a geometric deformation amount control unit configured to output different geometric deformation parameters for corresponding geometric deformations to respective ones of the plurality of coordinate computation units, a vector combining unit configured to collectively combine the coordinate moving vectors calculated by the plurality of coordinate computation units, thus generating combined coordinate moving vectors, and a transformation unit configured to, based on the combined coordinate moving vectors, transform coordinates of pixels in an image to be output into coordinates of the pixels of the input image, wherein the plurality of coordinate computation units perform the coordinate computations based on the coordinates of the pixels of the input image and the geometric deformation parameters input from the geometric deformation amount control unit, and the plurality of coordinate computation units are connected in series, and the post-geometric deformation coordinates output from the coordinate computation units in preceding stages are input as coordinates of the pixels of the image to the second and subsequent coordinate computation units among the plurality of coordinate computation units.

Accordingly, a second aspect of the present invention provides an image processing method for an image processing apparatus, comprising a step in which a geometric deformation amount control unit outputs, to respective ones of a plurality of coordinate computation units that performs coordinate computations through different geometric deformations on respective pixels of an input image, geometric deformation parameters for use in corresponding geometric deformations, a step in which the plurality of coordinate computation units calculates post-geometric deformation coordinates and coordinate moving vectors based on coordinates of the pixels of the input image and the geometric deformation parameters input from the geometric deformation amount control unit by performing the coordinate computations through the different geometric deformations, a step in which a vector combining unit collectively combines the coordinate moving vectors calculated by the plurality of coordinate computation units, thus generating combined coordinate moving vectors, and a step in which based on the combined coordinate moving vectors, a transformation unit transforms coordinates of pixels of an image to be output into coordinates of the pixels of the input image, wherein the plurality of coordinate computation units are connected in series, and the post-geometric deformation coordinates output from the coordinate computation units in preceding stages are input as coordinates of the pixels of the image to the second and subsequent coordinate computation units among the plurality of coordinate computation units.

Accordingly, a third aspect of the present invention provides a non-transitory computer-readable storage medium storing a program for causing a computer to execute an image processing method for an image processing apparatus, the image processing method comprising a step in which a geometric deformation amount control unit outputs, to respective ones of a plurality of coordinate computation units that performs coordinate computations through different geometric deformations on respective pixels of an input image, geometric deformation parameters for use in corresponding geometric deformations, a step in which the plurality of coordinate computation units calculates post-geometric deformation coordinates and coordinate moving vectors based on coordinates of the pixels of the input image and the geometric deformation parameters input from the geometric deformation amount control unit by performing the coordinate computations through the different geometric deformations, a step in which a vector combining unit collectively combines the coordinate moving vectors calculated by the plurality of coordinate computation units, thus generating combined coordinate moving vectors, and a step in which based on the combined coordinate moving vectors, a transformation unit transforms coordinates of pixels of an image to be output into coordinates of the pixels of the input image, wherein the plurality of coordinate computation units are connected in series, and the post-geometric deformation coordinates output from the coordinate computation units in preceding stages are input as coordinates of the pixels of the image to the second and subsequent coordinate computation units among the plurality of coordinate computation units.

According to the present invention, because a plurality of computations on geometric deformation elements can be effectively performed at a time, processing speed can be increased, memory access load can be reduced, and ease of control can be enhanced.

Further features of the present invention will become apparent from the following description of exemplary embodiments (with reference to the attached drawings).

DESCRIPTION OF THE EMBODIMENTS

Figure 1:
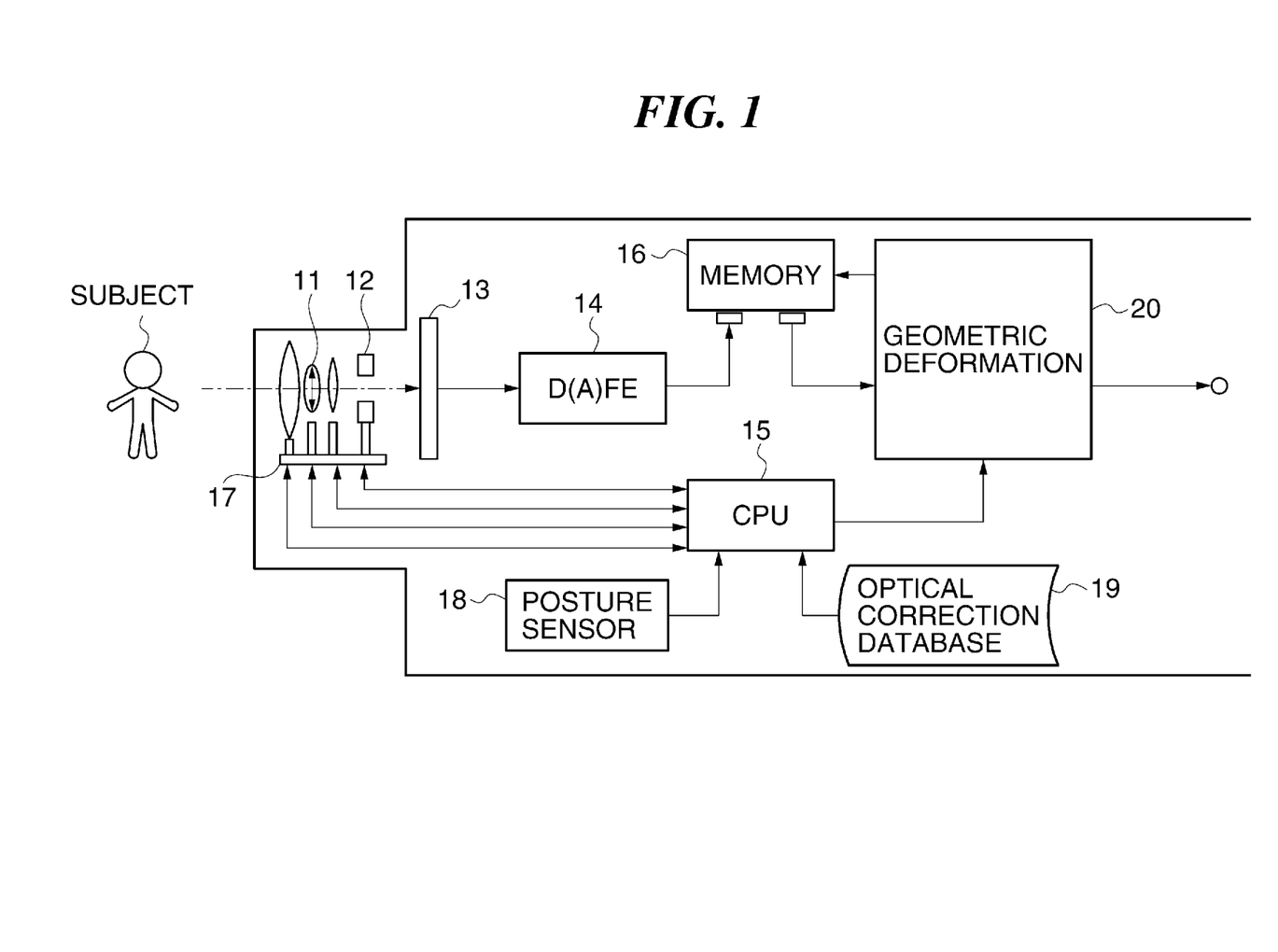
FIG. 1 is a block diagram schematically showing an arrangement of a digital camera which is an exemplary image processing apparatus according to the present invention.

FIG. 1 is a block diagram schematically showing an arrangement of a digital camera which is an exemplary image processing apparatus according to the present invention. The overall operation of the digital camera is controlled by a CPU 15.

The digital camera has a lens unit 11 which includes a zoom lens, a focus lens, and an optical vibration-isolating function, and a diaphragm 12. A shooting optical system comprised of the lens unit 11 and the diaphragm 12 is controlled in accordance with various factors such as zooming, movement of a subject, change of framing by a user, change of shooting environments such as brightness, and camera effects intended by the user. As a result, optical parameters typified by a focal length, a focus distance, an f number, and so on vary.

It should be noted that the optical vibration-isolating function shifts a part of a lens group in a direction of an optical axis and in a vertical direction to shift an optical image in the direction of the optical axis and in the vertical direction, thus reducing image vibrations caused by camera shake. The optical vibration-isolating function is controlled in accordance with motion of the digital camera, and hence an optical parameter called an image center, which means a point of intersection of the optical axis and an image plane, also varies with movement of a lens having the optical vibration-isolating function. Moreover, a geometric distortion caused by operation of an optical lens such as the zoom lens or the focus lens also varies in response to zooming and changes in optical parameters such as an image center.

Focus, aperture, and optical vibration-isolating function of the shooting optical system are controlled by an actuator-encoder 17 which actuates the shooting optical system and detects control states, and the actuator-encoder 17 operates in accordance with control signals from the CPU 15. In the digital camera, the lens unit 11 and the diaphragm 12 are actuated by an actuator based on drive pulses output from the CPU 15. Moving states of various lenses by actuation are read by an encoder, and optical parameter information such as a focal length, a focus distance, an f number, and an image center is transmitted to the CPU 15.

In the digital camera, an optical image passing through the shooting optical system is formed on a light-incident surface of an image pickup device 13, which in turn converts the optical image into an image signal comprised of an electric signal and outputs the same. When the image pickup device 13 is a CMOS image sensor or the like whose reading timing differs on the light-incident surface, rolling shutter distortions occur.

The image signal output from the image pickup device 13 is subjected to preprocessing by a digital (analog) frontend (D(A)FE) 14 and converted into a digital image signal. The digital image signal is temporarily stored in memory (RAM) 16. The digital image signal corresponds to one image when it is a still image signal, and corresponds to one frame image or one field image when it is a video (moving image) signal.

The digital camera has a posture sensor 18 which detects changes in the posture of a camera body. The posture sensor 18 has sensors such as a gyroscope, an acceleration sensor, and a geomagnetic sensor, and a dedicated CPU. The posture sensor 18 detects motion of the camera body in periods of exposure between frames and within frames of an image signal, and for example, calculates motion parameter information comprised of the amount of triaxial rotation and triaxial translation of the camera body per unit time and transmits the calculated motion parameter information to the CPU 15.

The CPU 15 determines geometric deformation parameters for the image signal based on optical parameters, motion parameter information, and optical correction data recorded in an optical correction database 19. It should be noted that the optical correction database 19 is a storage device such as a flash memory.

The digital camera has a geometric deformation circuit 20, which is an image processing circuit that geometrically deforms an image signal, which is generated by the digital (analog) frontend 14 and stored in the memory 16, according to geometric deformation parameters determined by the CPU 15. The image signal geometrically deformed by the geometric deformation circuit 20 is transmitted to a circuit in a succeeding stage (not shown) having an encoding circuit, a conversion circuit, which carries out tone correction or the like, an arbitrary image combination circuit, combines a plurality of image signals together to generate a new image signal, and so on.

Figure 2:
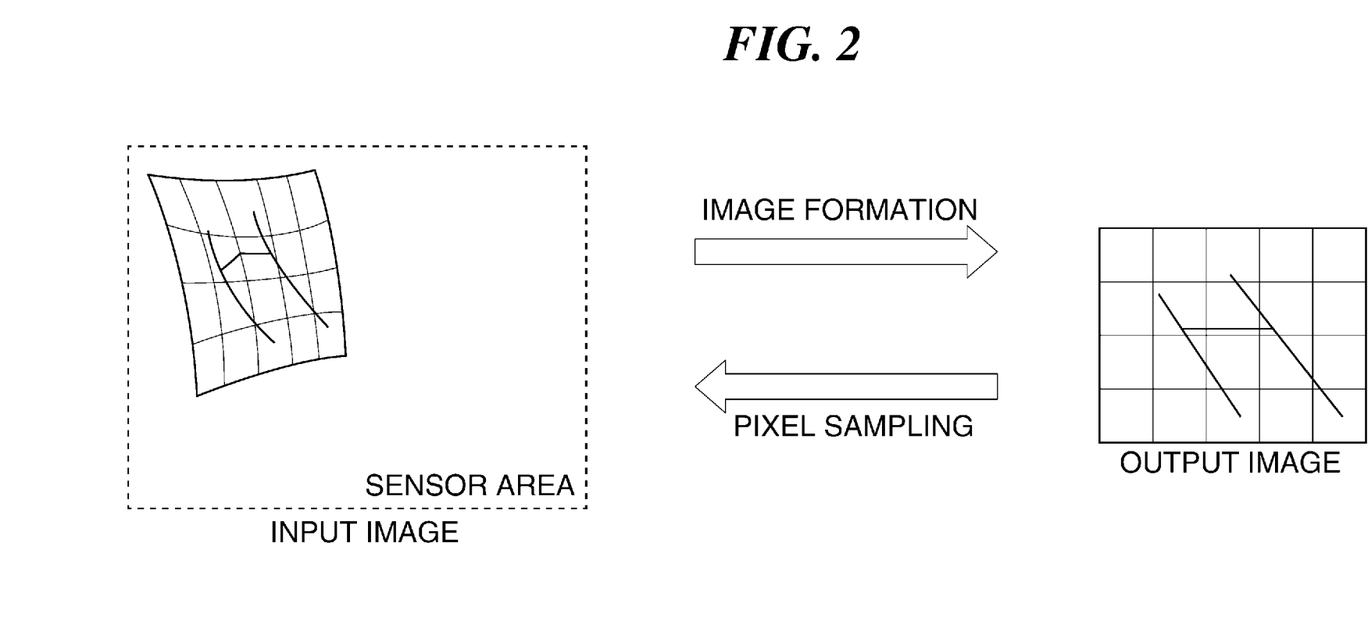
FIG. 2 is a view useful in explaining a backward mapping process carried out by a geometric deformation circuit which the image processing apparatus in FIG. 1 has.
Figure 3:
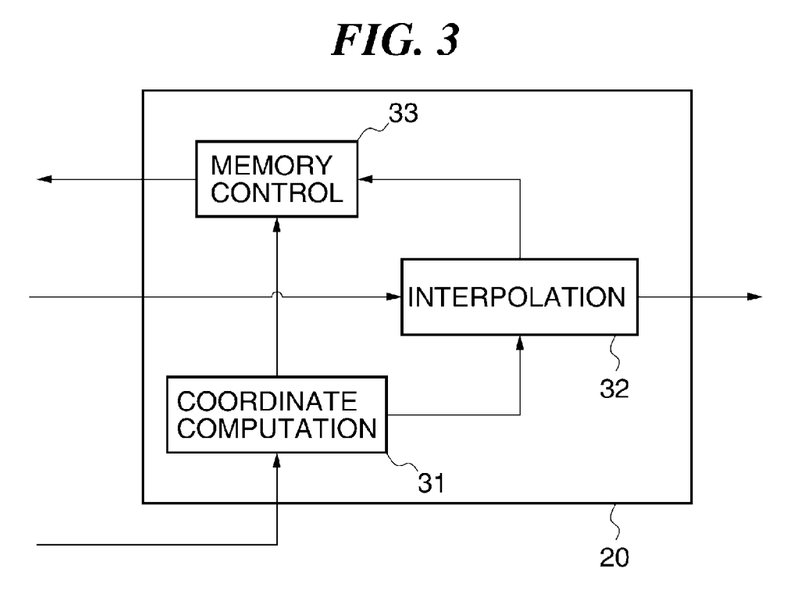
FIG. 3 is a block diagram showing a circuit arrangement of a geometric deformation circuit according to a first embodiment which the image processing apparatus in FIG. 1 has.

A detailed description will now be given of the geometric deformation circuit 20. FIG. 2 is a view useful in explaining a backward mapping process carried out by the geometric deformation circuit 20, and FIG. 3 is a block diagram showing a circuit arrangement of the geometric deformation circuit 20. Referring to FIG. 2, the geometric deformation circuit 20 realizes a geometric deformation process by the backward mapping process in which pixels are subjected to sampling and interpolation on an input image based on output image coordinates so as to prevent defects of pixels in an output image. In order to realize the backward mapping process, the geometric deformation circuit 20 has a coordinate computation circuit 31, an interpolation circuit 32, and a memory control circuit 33.

The coordinate computation circuit 31 successively scans (for example, raster-scans) pixels on an output image. Then, in accordance with optical parameters, motion parameters, and optical correction data, the coordinate computation circuit 31 carriers out a process in which it converts pixel coordinates on the output image into pixel coordinates on an input image based on geometric deformation parameters computed by the CPU 15.

The interpolation circuit 32 performs sampling based on the pixel coordinates on the input image obtained by the coordinate computation circuit 31, and generates data of output pixels through interpolation. The interpolation circuit 32 also carries out an interpolation process using pixel values near sampling coordinates on the computed input image according to an interpolation method. For the interpolation process, a bilinear interpolation method in which linear interpolation is carried out using 4 nearby pixels, a bi-cubic interpolation process in which cubic interpolation is carried out using 16 nearby pixels, or the like may be used.

The memory control circuit 33 provides control to read values of pixels near sampling coordinates from the memory 16 in accordance with the sampling coordinates on the input image calculated by the coordinate computation circuit 31 and an interpolation mode of the interpolation circuit 32, and transmit the read pixel values to the interpolation circuit 32.

Figure 4:
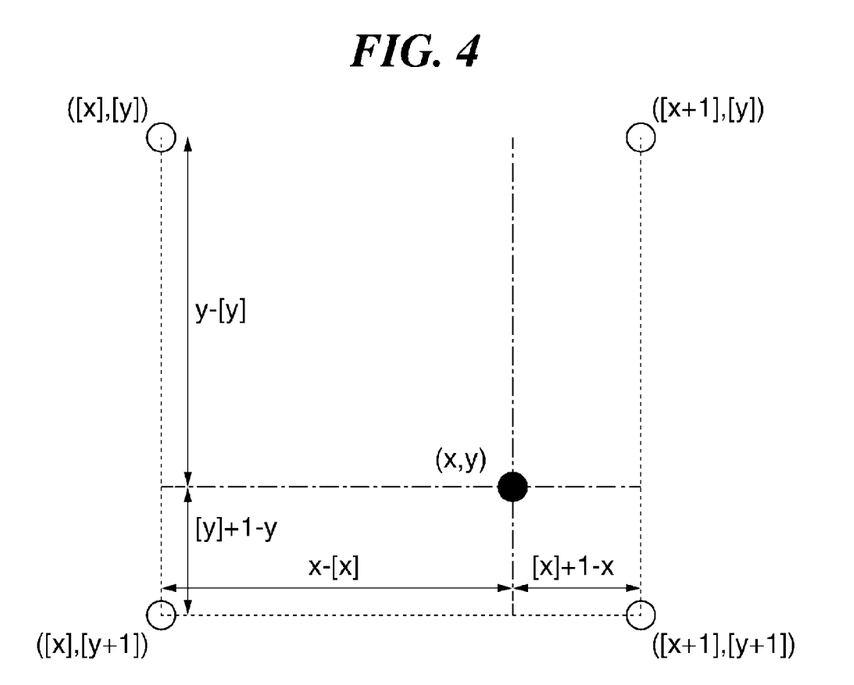
FIG. 4 is a diagram schematically showing a bilinear interpolation process, which is an exemplary interpolation process and carried out by the geometric deformation circuit which the image processing apparatus in FIG. 1 has.

FIG. 4 is a diagram schematically showing a bilinear interpolation process which is an exemplary interpolation process. The coordinate computation circuit 31 calculates sampling coordinates, which are indicated by a black circle, on an input image. The sampling coordinates are calculated as sub pixel coordinates having information after the decimal point. Due to the interpolation circuit 32 being in the bilinear interpolation mode, the memory control circuit 33 successively reads pixel values from the memory 16 so as to read four nearby pixels for the sampling coordinates. White circles in FIG. 4 indicate the read nearby pixels, and [x] and [y] of coordinate values represent integer coordinates. Using the pixel values of the four nearby pixels thus read, the interpolation circuit 32 calculates pixel values on an output image according to [Equation 1] below. In [Equation 1], I(x, y) represents a generated pixel value, and f([x], [y]) is a pixel value on an input image. An output image is generated by carrying out the process according to [Equation 1] in the order in which pixels were read.

[Mathematical Expression 1]

$$I(x,y)=([x]+1-x)([y]+1-y)f([x],[y])+([x]+1-x)(y-[y])f([x],[y]+1)+(x-[x])([y]+1-y)f([x]+1,[y])+(x-[x])(y-[y])f([x]+1,[y]+1)$$ [Equation 1]

Figure 5:
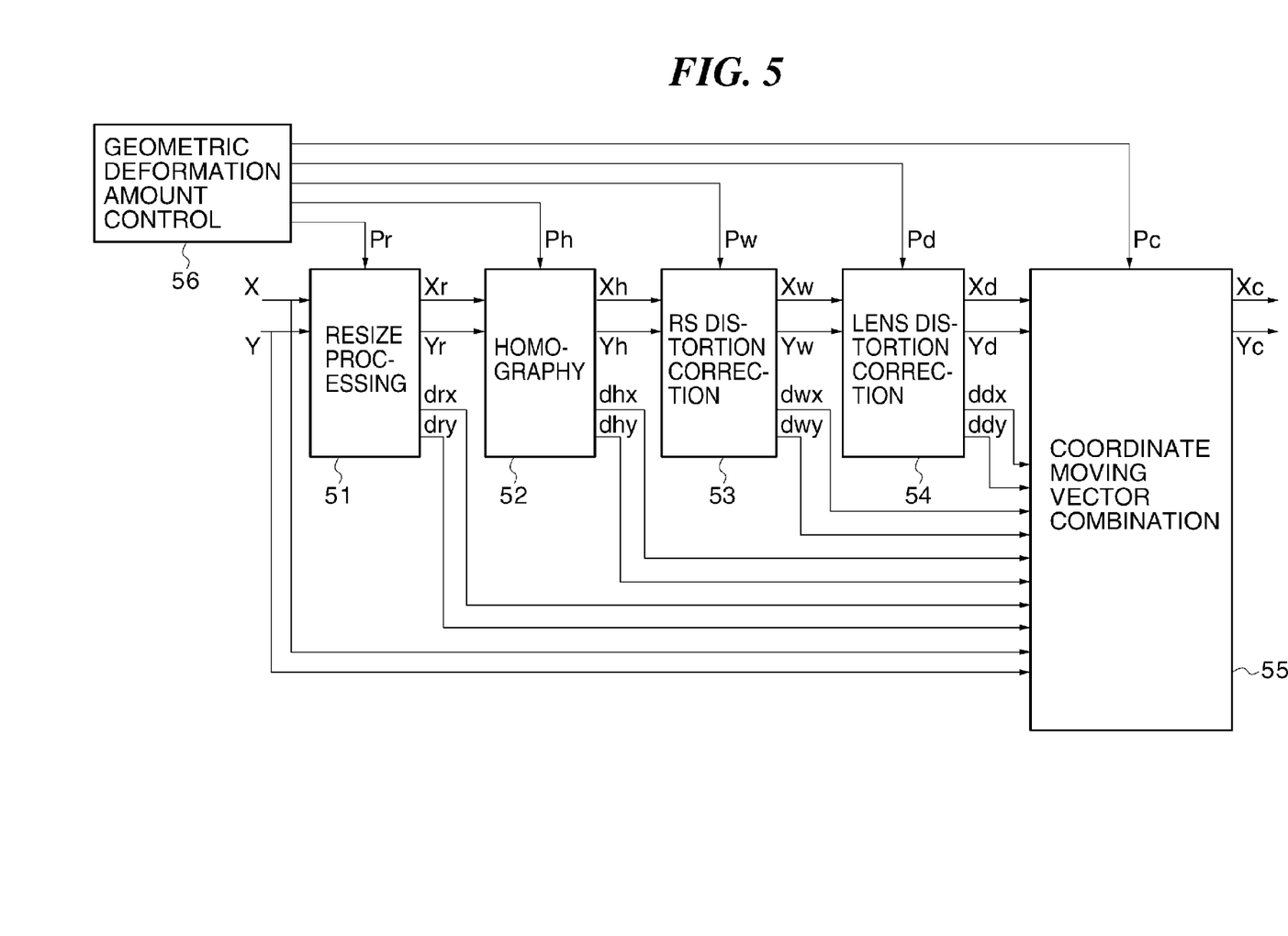
FIG. 5 is a diagram useful in explaining the outline of a computation process carried out by a coordinate computation circuit which the geometric deformation circuit in FIG. 3 has.

A detailed description will now be given of the coordinate computation circuit 31. FIG. 5 is a diagram useful in explaining the general outline of a computation process carried out by the coordinate computation circuit 31. The coordinate computation circuit 31 carries out coordinate computation in which it combines a plurality of coordinate transformations through geometric deformations into one coordinate transformation and successively converts coordinates of pixels on an input output image into sampling coordinates on an input image.

The coordinate computation circuit 31 has a resize processing circuit 51, a homography circuit 52, a rolling shutter distortion correction circuit (hereafter referred to as "the RS distortion correction circuit") 53, and a lens distortion correction circuit 54 as coordinate computation circuits corresponding to a plurality of geometric deformation elements. The coordinate computation circuit 31 also has a coordinate moving vector combining circuit 55 and a geometric deformation amount control circuit 56. The geometric deformation amount control circuit 56 assigns geometric deformation parameters Pr, Ph, Pw, Pd, and Pc, which are input from the CPU 15, to the coordinate computation circuits and the coordinate moving vector combining circuit 55 as shown in FIG. 5.

It should be noted that the geometric deformation parameters Pr, Ph, Pw, Pd, and Pc will be described below when deemed appropriate. Although detailed description will be given later, the resize processing circuit 51 adjusts output phases on frame memory in response to changes in the angle of view caused by electronic zooming. The homography circuit 52 controls changes of an image caused by rotation and translation arising from shake of the camera body. The RS distortion correction circuit 53 corrects for a distortion caused by motion of the camera body during a period of exposure within a frame. The lens distortion correction circuit 54 corrects lens aberration.

Referring to FIG. 5, the resize processing circuit 51 receives pre-geometric deformation coordinates X, Y and outputs coordinate moving vectors drx, dry and post-geometric deformation coordinates Xr, Yr. The homography circuit 52 receives the post-geometric deformation coordinates Xr, Yr from the preceding stage, and outputs coordinate moving vectors dhx, dhy and post-geometric deformation coordinates Xh, Yh. The RS distortion correction circuit 53 receives the post-geometric deformation coordinates Xh, Yh from the preceding stage and outputs coordinate moving vectors dwx, dwy and post-geometric deformation coordinates Xw, Yw. The lens distortion correction circuit 54 receives the post geometric deformation coordinates Xw, Yw from the preceding stage and outputs coordinate moving vectors ddx, ddy and post-geometric deformation coordinates Xd, Yd.

Thus, according to the present embodiment, the four coordinate computation circuits are connected in series, and among these coordinate computation circuits, the second and subsequent coordinate computation circuits receive post-geometric deformation coordinates as pixel coordinates of an image from the coordinate computation circuits in the preceding stages. It should be noted that the lens distortion correction circuit 54 is the coordinate computation circuit in the last stage, and hence it may skip output of the post-geometric deformation coordinates Xd, Yd.

The coordinate moving vectors drx, dry, dhx, dhy, dwx, dwy, ddx, ddy computed by the resize processing circuit 51, the homography circuit 52, the RS distortion correction circuit 53, and the lens distortion correction circuit 54 are output to the coordinate moving vector combining circuit 55. The coordinate moving vector combining circuit 55 collectively combines the input coordinate moving vectors to generate combined coordinate moving vectors Xc, Yc.

A description will now be given of the input-output relationship between the coordinate moving vectors drx, dry, dhx, dhy, dwx, dwy, ddx, ddy, the pre-geometric deformation coordinates X, Y, the post-geometric deformation coordinates Xr, Yr, Xh, Yh, Xw, Yw, Xd, Yd, computed by coordinate computation circuits and the combined coordinate moving vectors Xc, Yc generated as a result of combining by the coordinate moving vector combining circuit 55.

Figure 6:
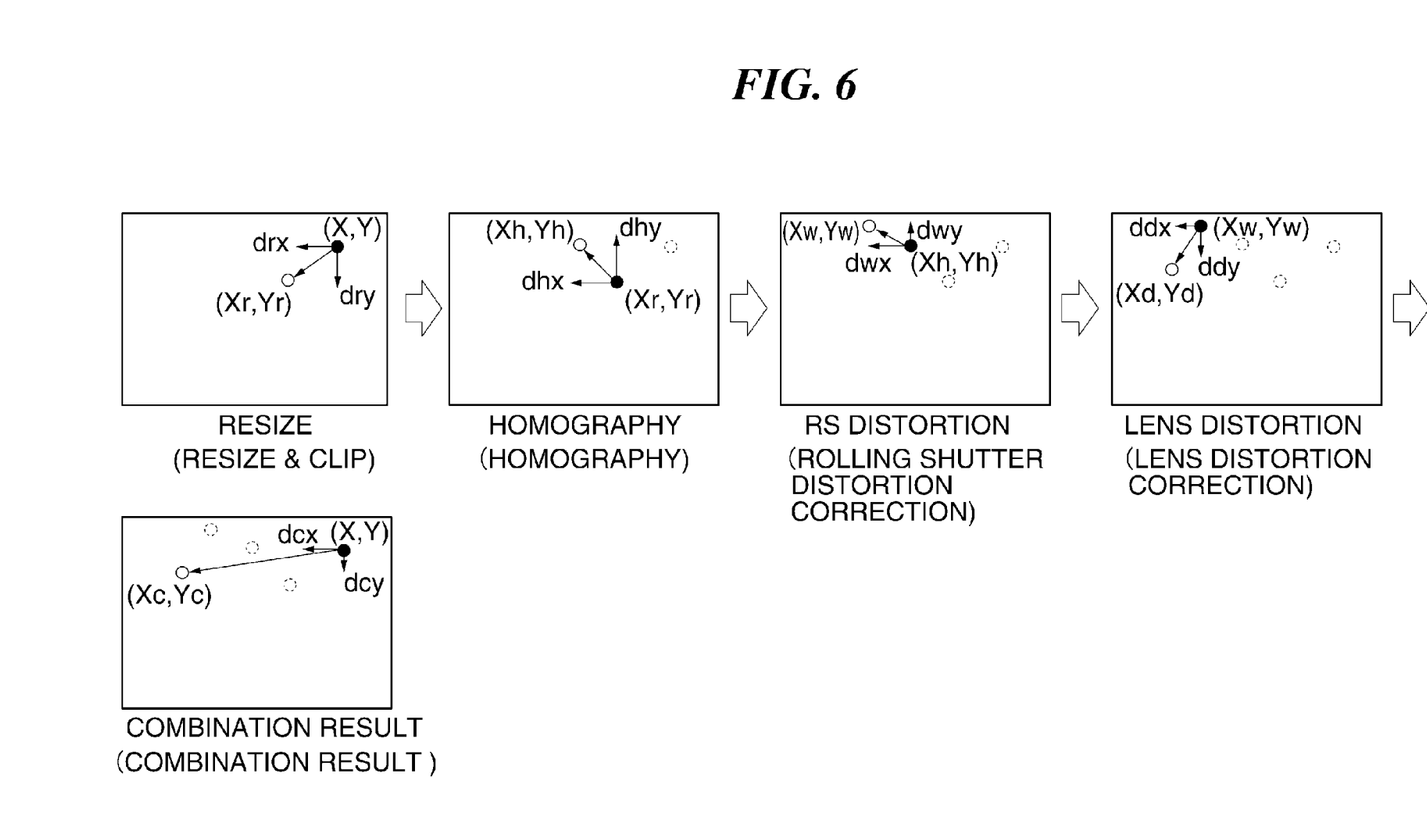
FIG. 6 is a view useful in explaining the relationship between a plurality of geometric deformation processes carried out by the coordinate computation circuit appearing in FIG. 5.

FIG. 6 is a view useful in explaining the relationship between results of a plurality of geometric deformation processes carried out by the coordinate computation circuit 31. For the backward mapping process, the coordinate computation circuit 31 performs geometric computations in descending order of physical effects on an optical image, and this order is as follows: resizing and clipping, homography, RS distortion correction, and lens distortion correction. Finally, the coordinate moving vector combining circuit 55 combines the coordinate moving vectors drx, dry, dhx, dhy, dwx, dwy, ddx, ddy, which are outputs from the coordinate computation circuits, by assigning weights according to the geometric deformation parameter Pc. It should be noted that FIG. 6 shows an example in which weights are evenly combined.

Figure 7A:
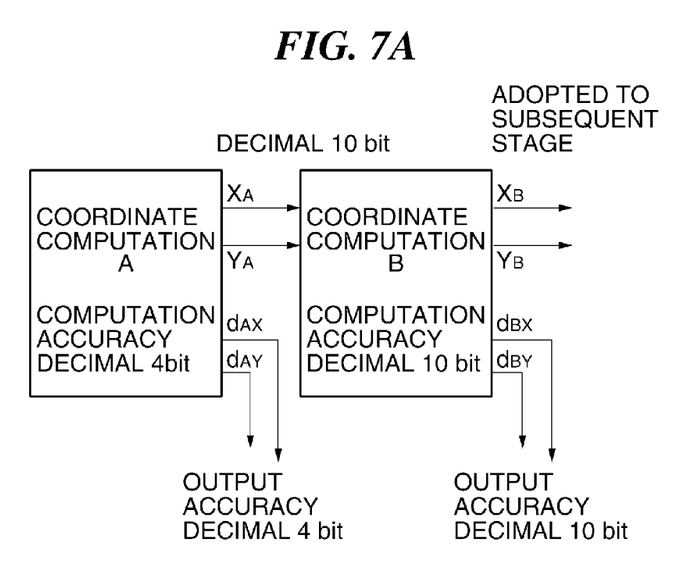
FIGS. 7A and 7B are views useful in explaining characteristics of accuracies of coordinate moving vectors and post geometric deformation coordinates of the coordinate computation circuits appearing in FIG. 5.
Figure 7B:
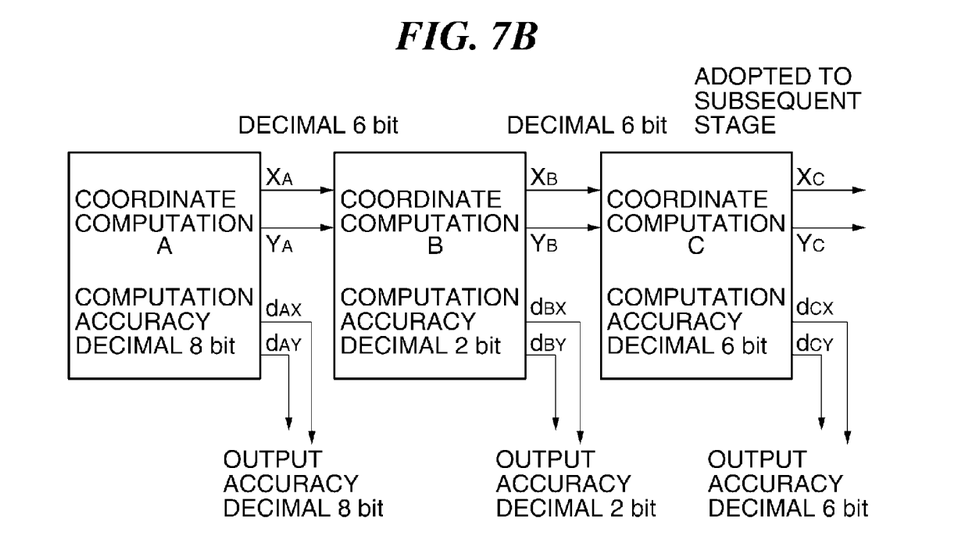

FIGS. 7A and 7B are views useful in explaining characteristics of accuracies of coordinate moving vectors and post-geometric deformation coordinates of the coordinate computation circuits which the coordinate computation circuit 31 has. Referring to FIG. 7A, coordinate moving vectors are output from the coordinate computation circuits with accuracies required for their geometric deformations. Post-geometric deformation coordinates are output from the coordinate computation circuits with computation accuracies of coordinate computation circuits connected in the succeeding stages irrespective of coordinate moving vector accuracies. As a result, coordinate computations for geometric deformations in succeeding stages can be performed without being limited by coordinate representation accuracies of geometric deformations in preceding stages.

More specifically, referring to FIG. 7B, accuracies of post-geometric deformation coordinates output from coordinate computation circuits located in preceding stages never fall below computation accuracies of post geometric deformation coordinates connected in the succeeding stages irrespective of accuracies of coordinate moving vectors respectively output from the coordinate computation circuits.

A benefit brought about by not obtaining post-geometric deformation sampling coordinates as a result of connecting post-geometric deformation coordinates but obtaining sampling coordinates as a result of combining coordinate moving vectors output from coordinate computation circuits is as explained hereafter. The benefit is that coordinate computation resolutions of respective geometric deformation elements can have effects on coordinates after composite computations. Moreover, more sophisticated control is possible when image margins in a geometric deformation process are controlled by the CPU 15. Specifically, control that could not be provided by simple tandem computations becomes possible; for example, effects of coordinate movements in succeeding stages which are low in accuracy and large in amount can be reduced by decreasing weights for combined geometric deformation parameters, and when accuracies of computations in preceding stages are high, minute effects of coordinate movements are emphasized.

A detailed description will now be given of coordinate computations performed by the coordinate computation circuit 31, and in particular, coordinate computations comprised of resizing and clipping, homography, RS distortion correction, and lens distortion correction and input geometric deformation parameters.

"Resizing" by the resize processing circuit 51, which is for electronic zooming, represents variations in the angle of view resulting from zooming, and "clipping" by the resize processing circuit 51 represent adjustment of output phases on frame memory. The resize processing circuit 51 performs coordinate computations using [Equation 2] to [Equation 4] below so as to correct for phase shifting caused by interlace processing or the like.

[Mathematical Expression 2]

$$\begin{bmatrix} X'_r \\ Y'_r \end{bmatrix} = \begin{bmatrix} r & 0 \\ 0 & r \end{bmatrix}\begin{bmatrix} X - X_{0r} \\ Y - Y_{0r} \end{bmatrix} + \begin{bmatrix} c \\ d \end{bmatrix} + \begin{bmatrix} X_{0r} \\ Y_{0r} \end{bmatrix} \quad \text{[Equation 2]}$$

-continued $$\begin{bmatrix} drx \\ dry \end{bmatrix} = \begin{bmatrix} X'_r - X \\ Y'_r - Y \end{bmatrix}$$ [Equation 3]

$$\begin{bmatrix} X'_r \\ Y'_r \end{bmatrix} \rightarrow \begin{bmatrix} X_r \\ Y_r \end{bmatrix}$$ [Equation 4]

Here, "r" is an inverse of a magnification, and "$X_{0r}$", "$Y_{0r}$" is a center of transformation, and "c, d" is the geometric deformation parameter Pr which represents translational movement by clipping and is given by the geometric deformation amount control circuit 56. An arrow "→" in [Equation 4] represents an operator of a bit adjustment computation from a computation accuracy into an output accuracy. A zooming transformation center should not always be an image center. Such a static transformation parameter can be indirectly obtained from a designation of an enlarged area by a user using a GUI, not shown, or obtained using information recorded in a register attached to the CPU 15 or the memory 16.

The homography circuit 52 controls changes in an image caused by rotation and translation arising from shake of the camera body. Based on motion parameters for the camera body obtained by the posture sensor 18, the CPU 15 calculates the degree of correction with consideration given to margins and the level of vibration isolation.

Geometric deformation parameters are given by 3×3 homography. For example, assuming that only motion of triaxial rotation is detected, and it is unnecessary to control the maximum amount of change because there are sufficient margins, homography for the geometric parameter Ph is given as expressed by [Equation 5] to [Equation 9] below.

[Mathematical Expression 3]

$$H = \begin{bmatrix} a & b & c \\ d & e & f \\ g & h & i \end{bmatrix}$$

$$= \begin{bmatrix} \cos(-\alpha R) & -\sin(-\alpha R) & 0 \\ \sin(-\alpha R) & \cos(-\alpha R) & 0 \\ 0 & 0 & 1 \end{bmatrix} \begin{bmatrix} 1 & 0 & 0 \\ 0 & \cos(-\alpha P) & -\sin(-\alpha P) \\ 0 & \sin(-\alpha P) & \cos(-\alpha P) \end{bmatrix}$$

$$\begin{bmatrix} \cos(-\alpha Y) & 0 & \sin(-\alpha Y) \\ 0 & 1 & 0 \\ -\sin(-\alpha Y) & 0 & \cos(-\alpha Y) \end{bmatrix}$$
[Equation 5]

$$\begin{bmatrix} X'_{0h} \\ Y'_{0h} \\ m \end{bmatrix} = H \begin{bmatrix} X_r - X_{0h} \\ Y_r - Y_{0h} \\ 1 \end{bmatrix} + \begin{bmatrix} X_{0h} \\ Y_{0h} \\ 0 \end{bmatrix}$$ [Equation 6]

$$\begin{bmatrix} X''_h \\ Y''_h \end{bmatrix} = \begin{bmatrix} X'_h / m \\ Y'_h / m \end{bmatrix}$$ [Equation 7]

$$\begin{bmatrix} dhx \\ dhy \end{bmatrix} = \begin{bmatrix} X''_h - X_r \\ Y''_h - Y_r \end{bmatrix}$$ [Equation 8]

$$\begin{bmatrix} X''_h \\ Y''_h \end{bmatrix} \rightarrow \begin{bmatrix} X_h \\ Y_h \end{bmatrix}$$ [Equation 9]

Here, "R", "P", and "Y" represent rolling, pitching, and yawing, respectively, of the camera body with respect to the optical axis, and "α" represents a vibration isolation rate, and negative signs represent vibration isolation. "$X_{0h}$, $Y_{0h}$" represents a center of transformation, and if an image center is used as the center of transformation, accurate computation is possible. An arrow "→" represents an operator for a bit adjustment computation from a computation accuracy into an output accuracy as is the case with the resize processing circuit 51.

The RS distortion correction circuit 53 corrects for a distortion (RS distortion) caused by shake of the camera body during a period of exposure within a frame. An RS distortion is caused by a motion of an image due to a camera motion (or an object motion) occurring during shift of exposure times between scan lines (horizontal pixel lines) within a frame. The RS distortion correction circuit 53 performs coordinate computations in accordance with the geometric deformation parameter Pw calculated by the CPU 15 based on motion parameters obtained by the posture sensor 18. For example, where a camera motion is only a minute change in constant speed in a yaw (Y) direction and a pitch (P) direction, and an arbitrary horizontal line within an image is a corrected invariant line $Y_{0w}$, geometric corrections are expressed by [Equation 10] to [Equation 12] below.

[Mathematical Expression 4]

$$\begin{bmatrix} X'_w \\ Y'_w \end{bmatrix} = \begin{bmatrix} X_h \\ Y_h \end{bmatrix} - \begin{bmatrix} y \\ p \end{bmatrix} (Y_h - Y_0 w)$$ [Equation 10]

$$\begin{bmatrix} dwx \\ dwy \end{bmatrix} = \begin{bmatrix} X'_w - X_h \\ Y'_w - Y_h \end{bmatrix}$$ [Equation 11]

$$\begin{bmatrix} X'_r \\ Y'_r \end{bmatrix} \rightarrow \begin{bmatrix} X_r \\ y_r \end{bmatrix}$$ [Equation 12]

Because Y coordinates of an image center is used for the invariant line $Y_{0w}$, computations highly consistent with other geometric deformation computations can be realized. "y, p" is an amount obtained by converting a camera motion in the yaw direction and the pitch direction between scan lines into a motion on an image, and this amount is given as the geometric deformation parameter Pw. For example, a camera motion is converted into a motion on an image using [Equation 13] to [Equation 14] below.

[Mathematical Expression 5]

$$y = f \tan(Y')/\Delta pix$$ [Equation 13]

$$p = -f \tan(P')/\Delta pix$$ [Equation 14]

"Y'" represents a motion of the camera body in the yaw direction occurring between scan lines, "f" is a focal length, and "Δp" represents a pixel size. The geometric deformation parameter Pw may be given for either every horizontal line or every predetermined section.

In calculation of the geometric deformation parameter Pw in the present embodiment, changes in camera motion are made to correspond to coordinates of an input image (image height of an output image) in coordinate computations. Originally, however, camera motions are recorded correspondingly to output coordinates (image height of an image on memory) in coordinate computations. Thus, strictly speaking, mapping should be performed so that a change in camera motion can correspond to an output image, in other words, an image height at input image coordinates in coordinate computations before it is used as a geometric deformation parameter. When a change in motion is small in terms of time, however, an error will be small even if a camera motion is made to correspond to an image height of output image coordinates in place of input image coordinates. Thus, in the present embodiment, making use of such a heuristic fact, motion parameters are used as they are.

The lens distortion correction circuit 54 corrects for lens aberration, mainly, radiation distortion. The CPU 15 chooses optical correction data corresponding to optical parameters, i.e. focal length, focus distance, and f number as the geometric deformation parameter Pd from the optical correction database 19. The geometric deformation parameter Pd is read using, for example, a table showing distortion rate output from design data or ideal image height which is a variation thereof to distorted image height.

A detailed description will now be given of coordinate computations by using an example in which the table showing the image height ratios is used. Coordinate computations are performed by converting pre-geometric deformation coordinates into polar coordinates using a center of transformation $X_{0d}$ and $Y_{0d}$ as a reference. The geometric correction is expressed by [Equation 15] to [Equation 18] below.

[Mathematical Expression 6]

$$r_n = \sqrt{(X_w - X_{0d})^2 + (y_w - Y_{0d})^2} \quad \text{[Equation 15]}$$

$$r_d = f(r_n)r_n \quad \text{[Equation 16]}$$

$$\begin{bmatrix} X'_d \\ Y'_d \end{bmatrix} = \frac{r_d}{r_n}\begin{bmatrix} X_w - X_{0d} \\ Y_w - Y_{0d} \end{bmatrix} + \begin{bmatrix} X_{0d} \\ Y_{0d} \end{bmatrix} \quad \text{[Equation 17]}$$

$$\begin{bmatrix} ddx \\ ddy \end{bmatrix} = \begin{bmatrix} X'_d - X_w \\ Y'_d - Y_w \end{bmatrix} \quad \text{[Equation 18]}$$

An image center is used as a center of transformation $X_{0d}$, $Y_{0d}$. "f(r)" represents the value of the ratio of an ideal image height to a distorted image height, which corresponds to an image height, and represents an operation in which an image height is extracted from the table using image heights as indexes. It should be noted that [Equation 17] expresses an operation in which a coordinate transformation from polar coordinates into perpendicular coordinates is carried out.

The coordinate moving vector combining circuit 55 collectively combines pre-geometric deformation coordinates X, Y and coordinate moving vectors drx, dry, dhx, dhy, dwx, dwy, ddx, ddy obtained by the coordinate computation circuits by assigning weights. As a result of this collective process, combined coordinate moving vector dcx, dcy and post geometric deformation coordinates Xc, Yc are obtained. This process is expressed by [Equation 19] to [Equation 20] below. It should be noted that "ax to dx" and "ay to dy" are geometric deformation parameters Pc that represent weights for use in combination.

[Mathematical Expression 7]

$$\begin{bmatrix} dcx \\ dcy \end{bmatrix} = \begin{bmatrix} ax & bx & cx & dx \\ ay & by & cy & dy \end{bmatrix}\begin{bmatrix} drx & dry \\ dhx & dhy \\ dwx & dwy \\ ddx & ddy \end{bmatrix} \quad \text{[Equation 19]}$$

$$\begin{bmatrix} Xc \\ Yc \end{bmatrix} = \begin{bmatrix} X \\ Y \end{bmatrix} + \begin{bmatrix} dcx \\ dcy \end{bmatrix} \quad \text{[Equation 20]}$$

As described above, according to the present embodiment, a plurality of geometric deformation processes can be collectively performed in one process. As a result, processing speed can be increased, memory access load can be reduced, and ease of control can be enhanced.

In the first embodiment, the coordinate computation circuit 31 performs computations in descending order of physical effects, namely, resizing and clipping, homography, RS distortion correction, and lens distortion correction. Moreover, for calculation of the geometric deformation parameter Pw to be used for RS distortion correction, an approximate method is used in which a change in camera motion which should correspond to an image height of output coordinates in coordinate computations is made to correspond to an image height of input image coordinates in coordinate computations.

When an optical lens which is largely distorted such as a fish-eye lens is used, however, a difference in image height between an input image and an output image, to which motion parameters should correspond, and an output image is too large, and hence the above approximation cannot be established, and the problem of image distortion may arise. In a second embodiment, this problem is solved by changing the arrangement of the coordinate computation circuit 31 which the geometric deformation circuit 20 appearing in FIG. 3 has to an arrangement of a coordinate computation circuit appearing in FIG. 8.

Figure 8:
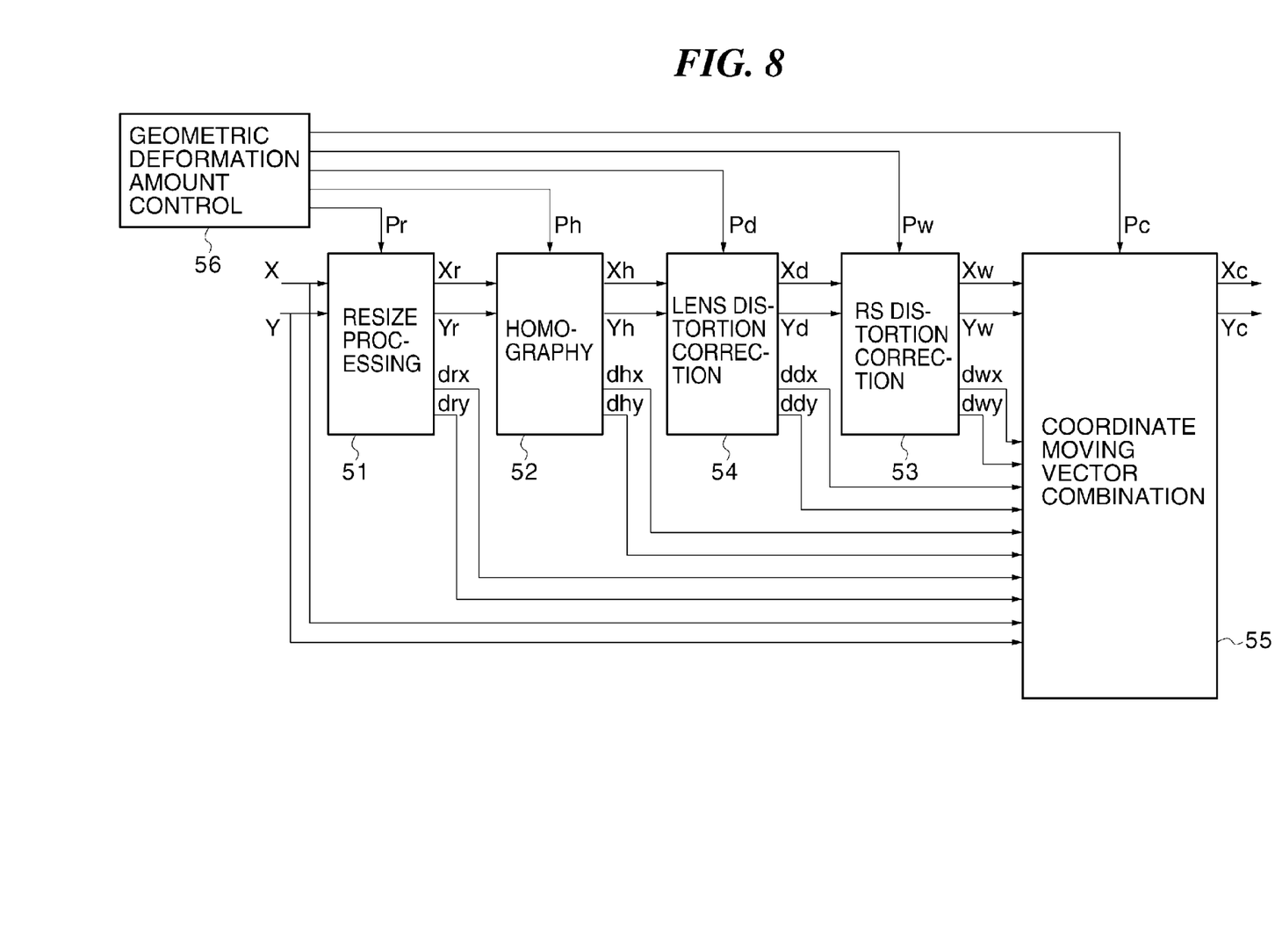
FIG. 8 is a diagram useful in explaining the general outline of a computation process carried out by the coordinate computation circuit provided with a geometric deformation circuit according to a second embodiment which the image processing apparatus in FIG. 1 has.

FIG. 8 is a diagram useful in explaining the outline of a computation process carried out by the coordinate computation circuit according to the second embodiment. The coordinate computation circuit appearing in FIG. 8 performs computations in the following order, resizing and clipping, homography, lens distortion correction, and RS distortion correction. Namely, the order of computation is reversed from RS distortion correction and lens distortion correction in FIG. 5 to lens distortion correction and RS distortion correction in FIG. 8, the other points are the same in the computations in FIG. 5 and FIG. 8.

Figure 9:
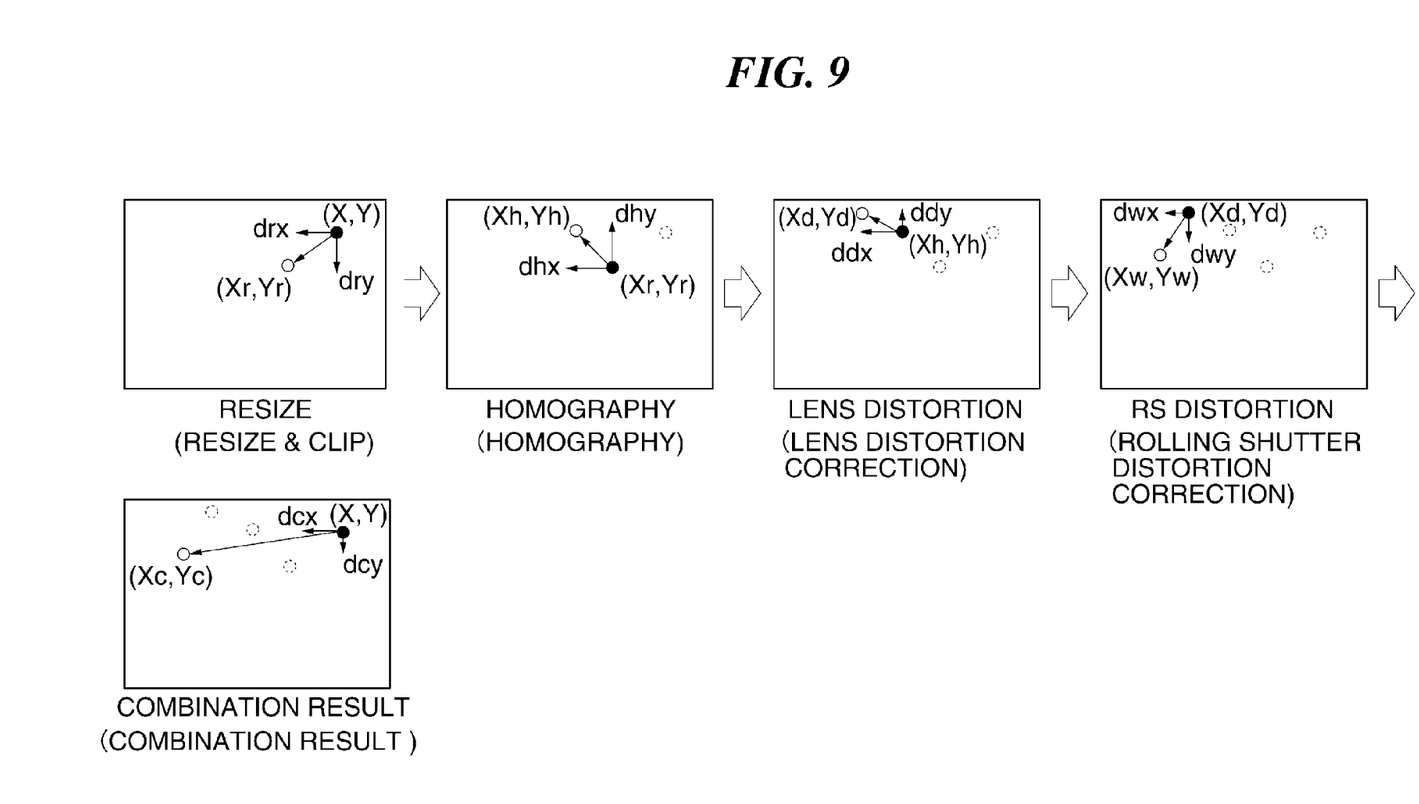
FIG. 9 is a view useful in explaining the relationship between a plurality of geometric deformation processes carried out by the coordinate computation circuit appearing in FIG. 8.

FIG. 9 is a view useful in explaining the relationship between process results of a plurality of geometric deformation processes carried out by the coordinate computation circuit appearing in FIG. 8. FIG. 9 shows the input-output relationship between coordinate moving vectors drx, dry, dhx, dhy, ddx, ddy, dwx, dwy calculated by coordinate computation circuits, pre-geometric deformation coordinates X, Y, post-geometric deformation coordinates Xr, Yr, Xh, Yh, Xd, Yd, Xw, Yw, and combined coordinate moving vectors Xc, Yc generated as a result of combining by the coordinate moving vector combining circuit 55. Because computations are performed in the following order, resizing and clipping, homography, lens distortion correction, and RS distortion correction, a difference in image height between input image coordinates and output image coordinates obtained by the RS distortion correction circuit 53 can be small, and a high level of accuracy in approximation can be maintained.

As described above, according to the second embodiment, highly accurate geometric deformations can be realized in a collective process even when an image is largely distorted.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269403 filed Dec. 10, 2012, which is hereby incorporated by reference herein in its entirety.

What is claimed is:

1. An image processing apparatus comprising:
a plurality of coordinate computation units configured to perform coordinate computations through different geometric deformations on respective coordinates in an image, thus each calculating converted coordinates and moving vectors;
a geometric deformation amount control unit configured to output different geometric deformation parameters for corresponding geometric deformations to respective ones of said plurality of coordinate computation units;
a vector combining unit configured to combine the moving vectors calculated by said plurality of coordinate computation units, thus generating combined moving vectors; and
a transformation unit configured to, based on the combined moving vectors, transform coordinates in an image to be outputted into coordinates in an inputted image,
wherein said plurality of coordinate computation units perform the coordinate computations based on an inputted coordinates and the geometric deformation parameters inputted from said geometric deformation amount control unit,
said plurality of coordinate computation units are connected in series, and
the converted coordinates outputted from the coordinate computation units in preceding stages are inputted as the inputted coordinates to the second and subsequent coordinate computation units among said plurality of coordinate computation units.

2. The image processing apparatus according to claim 1, wherein said plurality of coordinate computation units comprises a resize processing unit that carries out resizing, a homography unit that carries out homography, and distortion correction units that correct for distortions,
the resize processing unit, the homography unit, and the distortion correction units are connected together such that the coordinate computations are performed in the following order: resizing, homography, and distortion correction.

3. The image processing apparatus according to claim 2, wherein the distortion correction units comprise a rolling shutter distortion correction unit that corrects for rolling shutter distortion of an image pickup device, and a lens distortion correction unit that corrects for lens aberration,
the rolling shutter distortion correction units and the lens distortion correction unit are connected together such that the coordinate computations are performed in the following order: correction for rolling shutter distortion and correction for lens aberration.

4. The image processing apparatus according to claim 2, wherein the distortion correction units comprise a rolling shutter distortion correction unit that corrects for rolling shutter distortion of an image pickup device, and a lens distortion correction unit that corrects for lens aberration, and the rolling shutter distortion correction unit and the lens distortion correction unit are connected together such that the coordinate computations are performed in the following order: correction for lens aberration and correction for rolling shutter distortion.

5. The image processing apparatus according to claim 1, wherein said plurality of coordinate computation units outputs the moving vectors with computation accuracies required for the respective geometric deformations carried out by said plurality of coordinate computation units.

6. The image processing apparatus according to claim 1, wherein said plurality of coordinate computation units outputs the converted coordinates with computation accuracies of the coordinate computation units connected in succeeding stages irrespective of accuracies of the moving vectors.

7. The image processing apparatus according to claim 6, wherein said plurality of coordinate computation units outputs the converted coordinates with accuracies that never fall below computation accuracies of the coordinate computation units connected in succeeding stages.

8. The image processing apparatus according to claim 1, wherein said vector combining unit combines the moving vectors by assigning weights to the moving vectors calculated by said plurality of coordinate computation units.

9. An image processing method for an image processing apparatus, comprising:
a step in which a geometric deformation amount control unit outputs, to respective ones of a plurality of coordinate computation units that performs coordinate computations through different geometric deformations on respective coordinates in an image, geometric deformation parameters for use in corresponding geometric deformations;
a step in which said plurality of coordinate computation units calculates converted coordinates and moving vectors based on an inputted coordinates and the geometric deformation parameters inputted from the geometric deformation amount control unit by performing the coordinate computations through the different geometric deformations;
a step in which a vector combining unit combines the moving vectors calculated by the plurality of coordinate computation units, thus generating combined moving vectors; and
a step in which based on the combined moving vectors, a transformation unit transforms coordinates in an image to be outputted into coordinates in the inputted image,
wherein said plurality of coordinate computation units are connected in series, and the converted coordinates outputted from the coordinate computation units in preceding stages are inputted as the inputted coordinates to the second and subsequent coordinate computation units among said plurality of coordinate computation units.

10. A non-transitory computer-readable storage medium storing a program for causing a computer to execute an image processing method for an image processing apparatus, the image processing method comprising:
a step in which a geometric deformation amount control unit outputs, to respective ones of a plurality of coordinate computation units that performs coordinate computations through different geometric deformations on respective coordinates in an image, geometric deformation parameters for use in corresponding geometric deformations;
a step in which said plurality of coordinate computation units calculates converted coordinates and moving vectors based on an inputted coordinates and the geometric deformation parameters inputted from the geometric deformation amount control unit by performing the coordinate computations through the different geometric deformations;

a step in which a vector combining unit combines the moving vectors calculated by the plurality of coordinate computation units, thus generating combined moving vectors; and a step in which based on the combined moving vectors, a transformation unit transforms coordinates in an image to be outputted into coordinates in the inputted image, wherein said plurality of coordinate computation units are connected in series, and the converted coordinates outputted from the coordinate computation units in preceding stages are inputted as the inputted coordinates to the second and subsequent coordinate computation units among said plurality of coordinate computation units.

11. An image processing apparatus comprising:

a plurality of coordinate computation units configured to perform coordinate computations through different geometric deformations on respective coordinates in an image, thus each calculating converted coordinates and moving vectors;

a vector combining unit configured to combine the moving vectors calculated by the said plurality of coordinate computation units, thus generating combined moving vectors; and a transformation unit configured to, based on the combined moving vectors, transform coordinates in a first image into coordinates in a second image, wherein a second coordinate computation unit among said plurality of coordinate computation units is connected to a first coordinate computation unit among said plurality of coordinate computation units, and the second coordinate computation unit performs coordinates computations based on the converted coordinates outputted from the first coordinate computation unit.

12. The image processing apparatus according to claim 11, further comprising a geometric deformation amount control unit configured to output geometric deformation parameter for corresponding geometric deformations to at least one of said plurality of coordinate computation units.

13. The image processing apparatus according to claim 12, wherein the second coordinate computation unit performs coordinates computations based on the converted coordinates outputted from the first coordinate computation unit and the geometric deformation parameters inputted from said geometric deformation amount control unit.

14. The image processing apparatus according to claim 11, wherein a third coordinate computation unit among said plurality of coordinate computation units is connected to the second coordinate computation unit, and the third coordinate computation unit performs coordinates computations based on the converted coordinates outputted from the second coordinate computation unit.

15. The image processing apparatus according to claim 14, wherein the first coordinate computation unit comprises a resize processing unit that carries out resizing, the second coordinate computation unit comprises a homography unit that carries out homography, and the third coordinate computation unit comprises a distortion correction unit that corrects for distortions.

16. The image processing apparatus according to claim 14, wherein the first image is an outputted image and the second image is an inputted image.

17. The image processing apparatus according to claim 11, further comprising an interpolation unit configured to perform interpolation processing using pixel values in the second image according to the coordinates transformed by said transformation unit.

18. A method, comprising:

performing, using a plurality of coordinate computation units, coordinate computations through different geometric deformations on respective coordinates in an image, thereby calculating converted coordinates and moving vectors;

combining the calculated moving vectors, thereby generating combined moving vectors; and transforming, based on the combined moving vectors, coordinates in a first image into coordinates in a second image, wherein a second coordinate computation unit among said plurality of coordinate computation units is connected to a first coordinate computation unit among said plurality of coordinate computation units, and the second coordinate computation unit performs coordinate computations based on the converted coordinates outputted from the first coordinate computation unit.

19. A non-transitory computer-readable storage medium with an executable program stored thereon, wherein the program instructs a computer to perform the following steps:

performing, using a plurality of coordinate computation units, coordinate computations through different geometric deformations on respective coordinates in an image, thereby calculating converted coordinates and moving vectors;

combining the calculated moving vectors, thereby generating combined moving vectors; and transforming, based on the combined moving vectors, coordinates in a first image into coordinates in a second image, wherein a second coordinate computation unit among said plurality of coordinate computation units is connected to a first coordinate computation unit among said plurality of coordinate computation units, and the second coordinate computation unit performs coordinate computations based on the converted coordinates outputted from the first coordinate computation unit.

* * * * *